Jan. 29, 1963  R. M. WISE  3,075,571
APPARATUS FOR SPLICING RUBBER-LIKE ARTICLES
Filed June 16, 1961  5 Sheets-Sheet 1

INVENTOR
RALPH M. WISE
BY Steward & Steward
his ATTORNEYS.

INVENTOR
RALPH M. WISE

Jan. 29, 1963  R. M. WISE  3,075,571
APPARATUS FOR SPLICING RUBBER-LIKE ARTICLES
Filed June 16, 1961  5 Sheets-Sheet 3

INVENTOR
RALPH M. WISE
BY Steward & Steward
his ATTORNEYS.

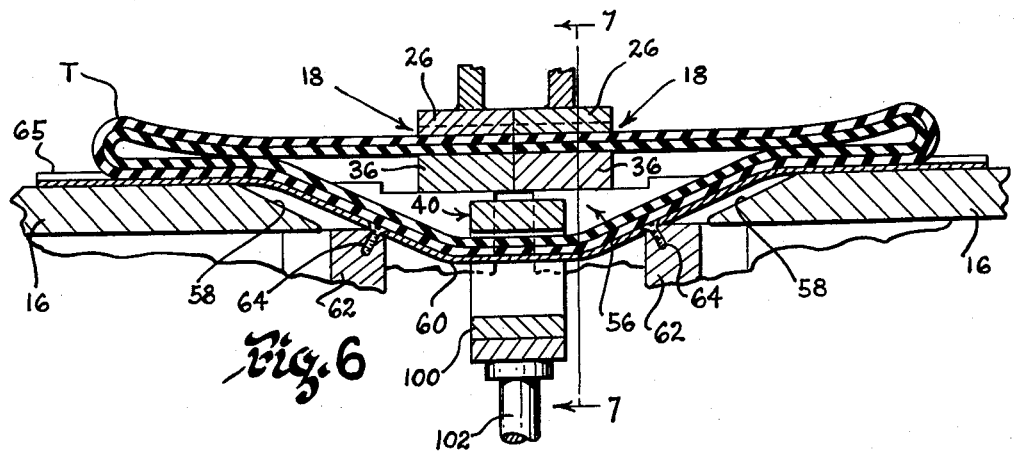
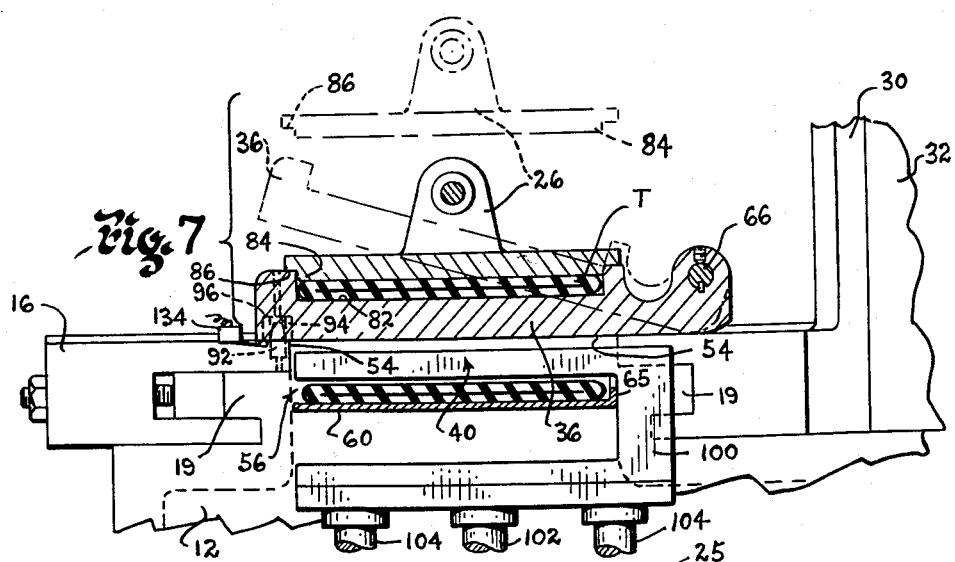
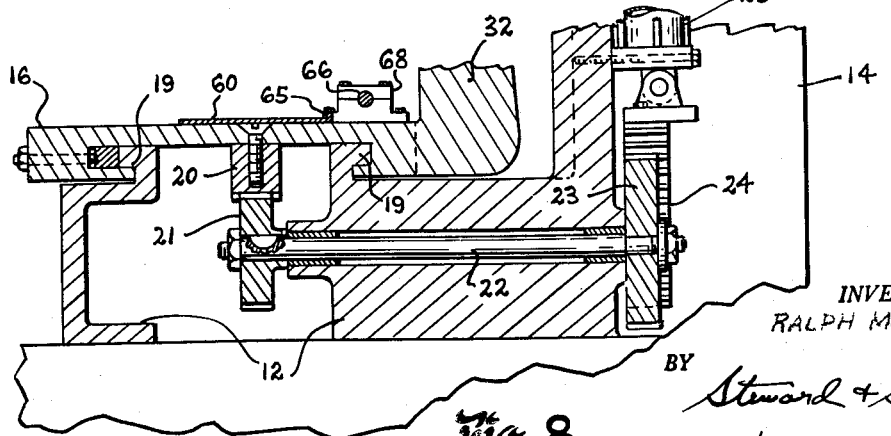

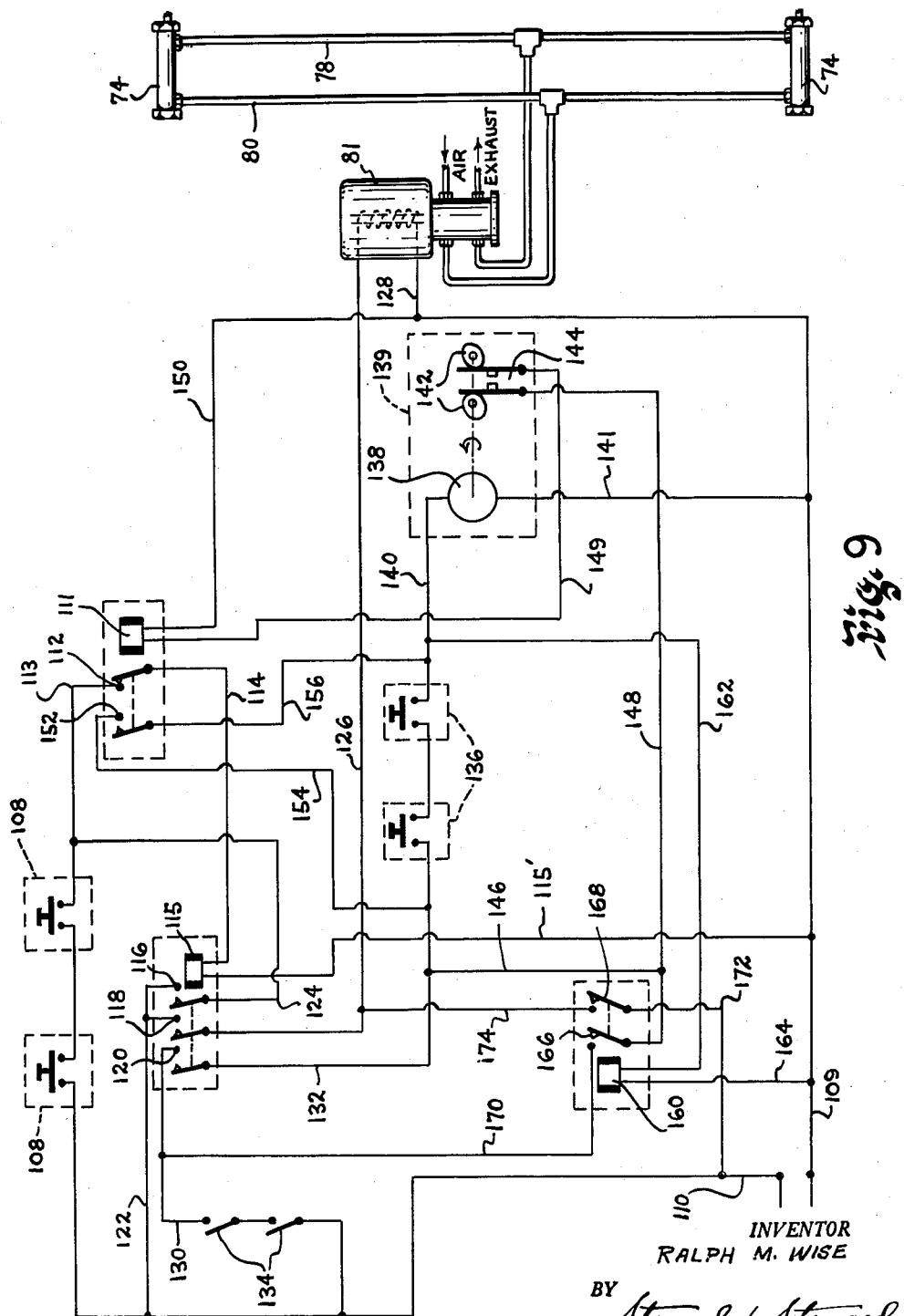

United States Patent Office 3,075,571
Patented Jan. 29, 1963

3,075,571
APPARATUS FOR SPLICING RUBBER-LIKE ARTICLES
Ralph M. Wise, Milford, Conn., assignor to The Armstrong Rubber Company, West Haven, Conn., a corporation of Connecticut
Filed June 16, 1961, Ser. No. 117,693
7 Claims. (Cl. 156—502)

This invention relates to apparatus for splicing the ends of lengths of rubber or rubber-like material into endless tubes or bands, and it relates more particularly to apparatus for splicing the ends of unvulcanized inner tube stock.

For many years machines have been used for automatically carrying out what is now common practice in splicing the ends of lengths of rubber either in tubular form, where the article being manufactured is an inner tube, or in non-tubular shapes, where for example tread bands are formed in the manufacture of pneumatic tires. Most of these machines, however, are designed to handle tubes or bands of relatively large inside diameter, that is, on the order of 14 inches and larger. As a result such machines are useless in the large-scale production of small-size products which are incapable of fitting these particular machines.

It is an object of the present invention to modify splicing machines of this type which are limited with respect to the size of the products they can handle because of their basic design. Since these machines are quite satisfactory for splicing products such as inner tubes in the sizes for which they were designed, it is not contemplated that basic changes be made in the operation of the machine. It is, however, desired to adapt existing or future apparatus of this general design so that they can handle tubes of substantially smaller sizes without resorting to the expense of completely redesigning the machine.

Another object of the invention is to provide an inexpensive way of modifying existing splicing machines so that they can handle smaller products, thereby avoiding the expense of purchasing another machine designed especially for that purpose.

Besides saving present users of such machines substantial expense in increasing the utility of their existing equipment, the invention is also of substantial advantage to the manufacturer of such machines in that it eliminates the necessity for completely redesigning an otherwise satisfactory piece of equipment in order to meet the demand for machines capable of handling smaller size tubes.

With the foregoing objects and advantages in view and others which will become apparent hereinafter, an example of the basic type of machine in which the invention is applicable and of a practical embodiment of the invention will now be described in connection with the accompanying drawings, in which, FIG. 1 is a front elevational view, partially broken away and in section, of a machine embodying the invention;

FIG. 6 is a view similar to FIG. 5, but showing the parts in the positions which they assume during another phase of the splicing cycle and with the trimming knife withdrawn;

FIG. 7 is a section taken on the line 7—7 of FIG. 7.
FIG. 8 is a section taken on the line 8—8 of FIG. 1; and
FIG. 9 is a wiring and piping diagram showing the control system for operating the pivoted lower jaws of the present invention.

Figure 1:
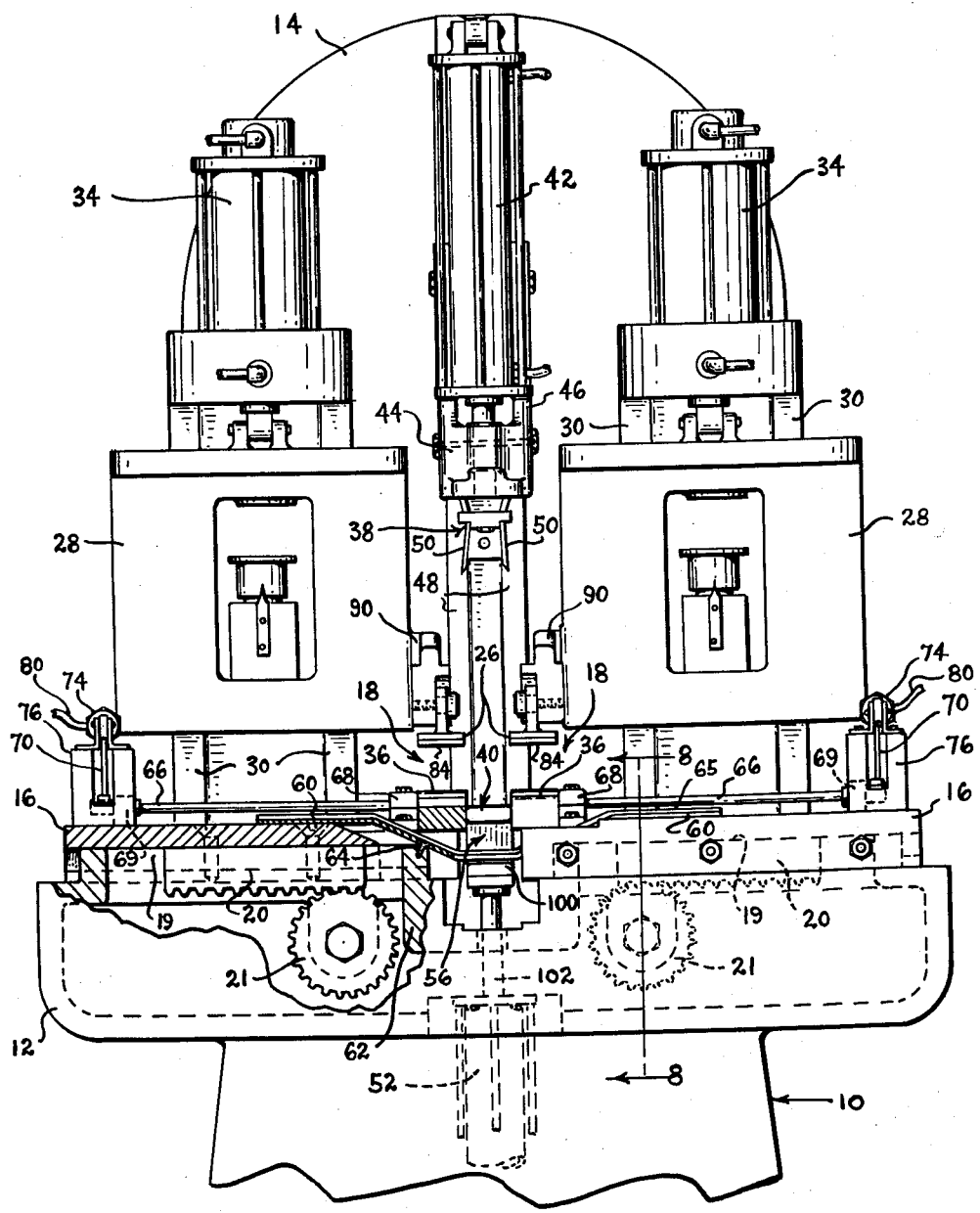
Figure 2:
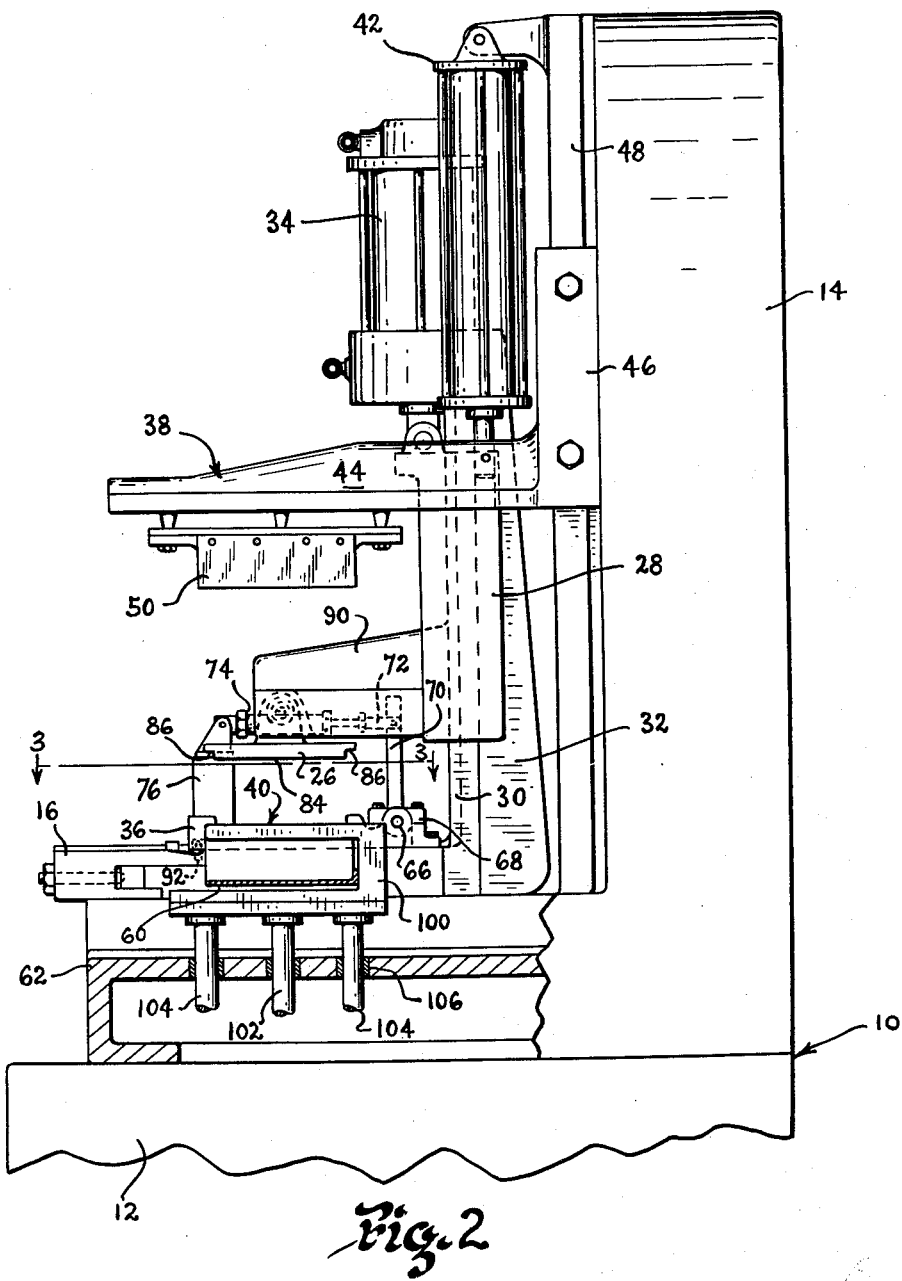
FIG. 2 is a side elevational view, partially broken away and in section, of the machine shown in FIG. 1.

A tube splicing machine of the general type in which the present invention is applicable is shown in FIGS. 1 and 2 of the drawings, wherein is shown a base 10, comprising a large frame having a forwardly offset portion 12 and an upwardly extending portion 14. Mounted for reciprocal horizontal movement on the upper side of the offset portion 12 of the frame are a pair of transversely movable carriages 16, each of which carries a clamp, indicated generally at 18 (FIGS. 1, 5 and 6), for tightly gripping the ends of a length of inner tube stock T during the splicing operations.

As will be seen in FIGS. 1 and 8, carriages 16 are reciprocated toward and away from each other on horizontal tracks 19 formed in the upper side of the offset portion 12 of base 10. Gear racks 20 on the undersides of carriages 16 mesh with front pinions 21 on drive shafts 22 which extend rearwardly through the frame of the machine where rear pinions 23 engage opposite sides of a vertically disposed gear rack 24 connected to the piston of a pneumatic cylinder 25 mounted on the back side of the upper portion 14 of the frame. It will be readily apparent that as rack 24 is moved up and down by cylinder 25, carriages 16 are respectively spread apart and moved together in unison.

The upper jaws 26 of clamps 18 are mounted on vertically movable plates 28 slidably mounted on tracks 30 which extend upwardly from carriages 16 on the front side of brackets 32 rigidly mounted or integral with carriages 16 at the back edges thereof. Each plate 28 is fastened at its upper end to the piston of a pneumatic cylinder 34 supported at the upper end of each bracket 32. Plates 28 are therefore raised and lowered on tracks 30 by means of cylinders 34 so that jaws 26 may be lowered into gripping engagement with the ends of tube T previously placed on a pair of lower clamping jaws 36 mounted at the inner edges of carriages 16.

A cutter designated generally at 38 is supported on the upper portion 14 of base 10 between carriages 16, plates 28 and cylinders 34, for vertical movement into and out of cutting relation with an anvil 40, on which the ends of tube T are trimmed just prior to the splice. Cutter 38 is raised and lowered by means of a cylinder 42 mounted on the upper frame portion 14 of the machine. An arm 44 of cutter 38 projects forwardly from a mounting plate 46 guided on vertical tracks 48 on the front of frame portion 14. Mounted on the underside of cutter arm 44 directly above anvil 40 are a pair of spaced knives 50, which are desirably electrically heated in the usual manner in order to soften the ends of the unvulcanized tube as they are being trimmed just prior to their being brought into abutment with each other. Anvil 40 is movably supported on its underside by a vertically disposed pneumatic cylinder 52 (FIG. 1) mounted in base 10 of the machine so that it can be lowered when carriages 16 are brought together.

The basic elements or parts of the tube splicing machine described so far are more or less conventional in machines of the type used in splicing innner tubes, in which the present invention is applicable. In the operation of such machines, the parts are initially set in the positions shown in FIG. 1 insofar as the conventional elements of the machine are concerned, with the carriages 16 separated, and with anvil 40, upper jaws 26 and cutter 38 in their elevated positions. In some machines of this general type, a length of tube is placed over a supporting shield (not shown) above cutter 38 so that it does not come in contact with any of the moving parts of the machine. The ends of the tube are then placed face-to-face on anvil 40 so that the tube extends outwardly therefrom across the upper surfaces of lower clamping jaws 36. With the tube thus completely encircling the cutter 38, the upper jaws 26 are lowered in order to clamp the ends of the tube on carriages 16. Cutter 38 is then lowered between clamps 18 severing the ends of the tube on anvil 40 and is immediately raised back to the position shown in FIG. 1. While cutter 38 is being raised after trimming the ends of the tube, anvil 40 is lowered to a position below clamps 18 where it is out of the way of the movement of carriages 16 toward each other so that the freshly cut butt-ends of the tube are brought together into intimate engagement with each other and held in this position long enough to form the splice.

This general method of splicing inner tubes is old in the art, as shown for example in the patents to Haase 2,024,577 and 2,024,578, which discloses a machine of basically the same design except that the upper clamping jaws are hinged instead of being vertically movable as in the case of the machine illustrated in the present drawings. It will be understood of course that the invention is applicable to both types of machines where the upper clamping jaws are hinged and where they are vertically rising. It will be noted moreover that in the machine disclosed by Haase the mid-section of the tube may be disposed below the splicing carriages so that it completely encircles these members instead of being disposed above the cutter, as described hereinabove. It will be apparent however that in both cases, due to the size of the carriages and of the cutting device, it is impractical for the machine to handle tubes, which are not large enough to encircle either the cutting apparatus 38 or the carriages 16. Many machines of this type, therefore, have been virtually useless in the large-scale production of tubes on the order of about eight inches in inside diameter and smaller.

Figure 5:
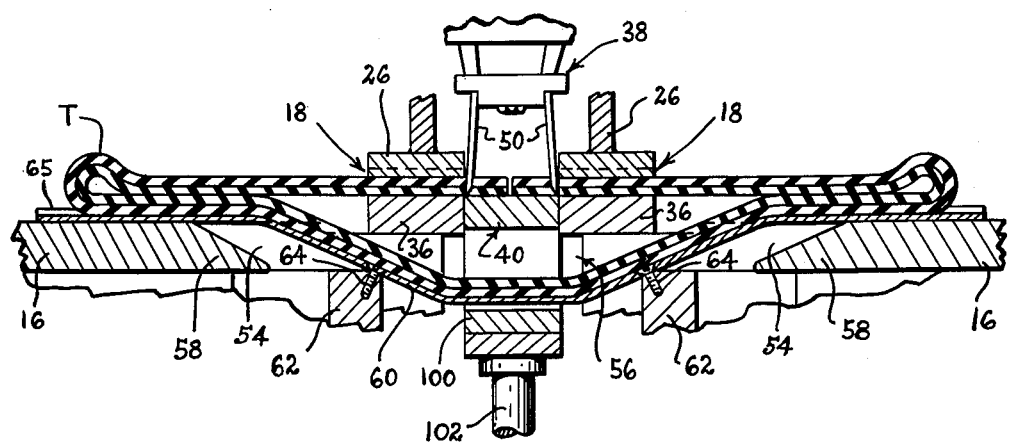
FIG. 5 is an enlarged fragmentary detail view in vertical section, showing the support carriages, trimming knife and clamping jaws in which the ends of the tube are held during the splicing cycle.
Figure 4:
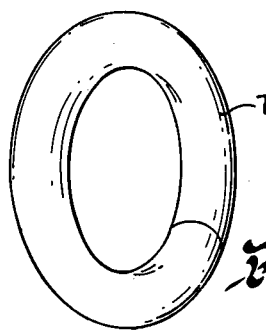
FIG. 4 is a perspective view of an inflated inner tube showing the splice line.

The present invention is intended to render such machines capable of splicing smaller size tubes by permitting the mid-section of the tube to lie between the laterally movable carriages and directly under the clamps, as illustrated for example in FIGS. 5 and 6 of the accompanying drawings. In this way, it is not necessary for the tube to completely encircle the carriages and support frame therefor or to be draped over the top of the cutting device, as has been the case heretofore. Consequently, tubes of substantially smaller size can be spliced by this machine when modified in accordance with the present invention.

Figure 3:
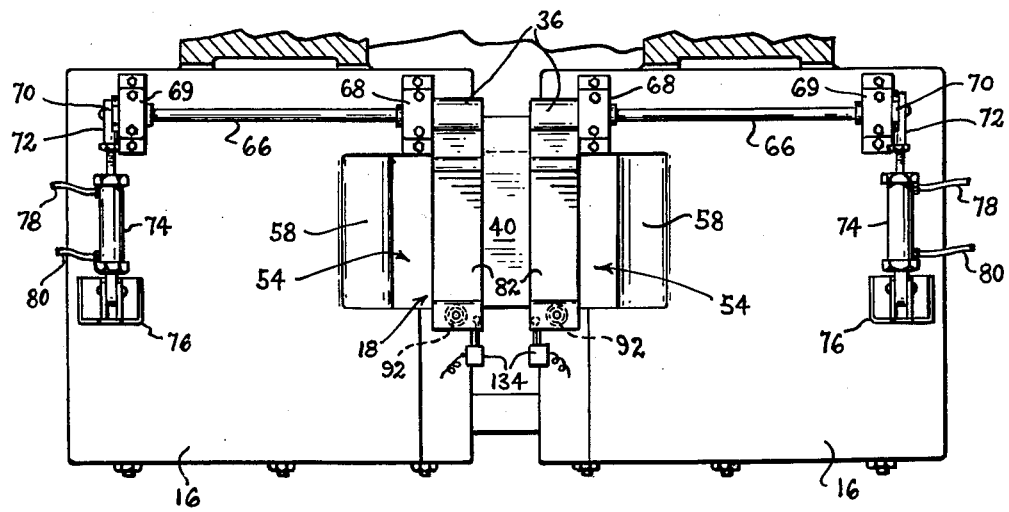
FIG. 3 is a horizontal section thereof, taken along the line 3—3 in FIG. 2, with certain parts removed.

In order to accomplish this, carriages 16 are each deeply recessed at 54 (FIG. 3) along their adjacent edges in the vicinity of lower clamping jaws 36 in order to provide an open space 56 centrally of carriages 16 and below jaws 36. Recesses 54 are located opposite each other approximately mid-way between the front and back edges of the carriages 16 and are made sufficiently wide and deep so that the tube T will fit under jaws 36 as shown in FIGS. 5 and 6. Means are provided for quickly and easily inserting a tube under jaws 36 by pivotally mounting jaws 36 at the back edges of carriages 16, as shown in FIGS. 2 and 7, so that they can be raised at their front ends or lowered to their operative position in which they span recesses 54 with their free ends resting on the upper surfaces of carriages 16 adjacent the front edges of recesses 54.

As shown in FIGS. 5 and 6, the upper corner of bottom edges 58 of recesses 54 are beveled so that when the carriages are together edges 58 do not contact a fixed supporting pan 60 which extends outwardly on both sides of clamps 18 in overlapping relation with carriages 16 and passes under lower clamping jaws 36 into the open space 56 between the carriages. Supporting pan 60, which has been omitted in the plan view of FIG. 3 in order to more clearly show the construction of carriages 16, is secured to a stationary portion 62 of base 10 by means of screws 64. The mid-section of tube T is therefore held in place by pan 60 while carriages 16 move toward and away from each other in order to bring the ends of the tube into splicing engagement with each other. The back edge of pan 60 is provided with an upturned flange 65 to prevent the tube T from coming in contact with any movable parts of the machine.

Lower clamping jaws 36 are rigidly secured to pivot shafts 66 which extend in opposite directions from each other through bearing blocks 68 and 69 to crank levers 70 adjacent the outer ends of carriages 16. Each lever 70 projects vertically upward from its shaft 66, to which it is rigidly secured as by means of a set-screw or the like. Adjacent the upper end of lever 70 is pivotally connected an adjustable arm 72, which connects lever 70 with the piston of an actuating cylinder 74 pivotally mounted at its opposite end on a bracket 76 mounted on the upper surface of carriage 16. As will be seen from FIG. 3 the means for pivoting each lower jaw 36 is supported on its carriage separate from the other in order to permit carriages 16 to move relative to each other. Cylinders 74 are operated by compressed air supplied through air hoses 78 and 80 connected to suitable control valve 81 (FIG. 9) for raising the jaws 36 to their broken line position shown in FIG. 7 when a tube T is to be placed in or removed from the machine, and for lowering jaws 36 to their normal full-line position as soon as the tube is in place on support pan 60. The height to which jaws 36 are raised is readily adjusted by means of the turnbuckle arrangement on adjustable arms 72 at the actuating cylinders 74. It is apparent of course that jaws 36 could be raised or lowered by hand rather than by means of cylinders 74. However, for safety purposes it is desirable that jaws 36 operate by remote control in order to reduce the chances of accidents.

Referring again to lower jaws 36 and more particularly to FIG. 7 of the drawings, the upper surfaces of these members are formed with depressions 82 of a suitable size to receive the end-section of tube T without cramping it laterally when pressure is applied by upper jaws 26. The under surface of each upper jaw 26 is formed with a corresponding projection 84 which is snugly received within depression 82 of lower jaw 36 and contacts the upper side of tube T. Shoulders 86 formed by projection 84 at opposite ends of the upper jaw 26 engage the front and rear portions of lower jaws 36 on opposite sides of depression 82. This arrangement prevents the jaws from damaging the tube while at the same time permitting the tube to be gripped tightly while being trimmed and spliced. While the depression 82 in lower jaws 36 is shown permanently formed therein, this depression could, if desired, be made adjustable as is presently done in the lower jaw or female clamping die in order to accommodate stock of different widths. Moreover, the upper jaws 26 could be of the so-called segmented type instead of solid as shown.

In order to make a good splice it is important that the engaging sides of both clamping jaws 26 and 36 on the two carriages 16 be lined up parallel to each other. Moreover, the clamping jaws must be adequately supported laterally, that is tin the direction of movement of carriages 16, so that when carriages 16 are brought together, the clamping jaws, which engage in the manner shown in FIG. 6, do not move laterally on carriages 16. Upper jaws 26 are in this instance pivotally mounted in a conventional manner to forwardly projecting arm portions 90 of plates 28, the fore-and-aft pivotal movement of jaws 26 being provided in order to ensure that the clamping pressure is applied uniformly across the tube section. Since lower jaws 36 are pivoted at one end in accordance with the present invention, it is desirable in order to avoid excessive pressure tending to twist these members laterally about their pivoted ends, to support the front ends of jaws 36 against such movement. One way of accomplishing this is illustrated in FIG. 7, which shows a tapered pin 92 mounted in the upper surface of each carriage 16 near the front edge of recess 54 and in position to project upwardly into a socket 94 in the underside of lower jaw 36 where it rests against carriage 16 when in its operative position. By tapering pin 92, it is possible to obtain a tight fit within socket 94 and thereby maintain the clamping jaws in accurate alignment. If desired, socket 94 may be provided with a sleeve 96 of softer metal than that used in pin 92 so that in case of wear the liner 96 may be replaced.

The anvil 40, which in its elevated position shown in FIGS. 1, 2 and 5 cooperates with the knife blades 50 of cutter 38 to trim the ends of the tube, comprises a horizontally disposed U-shaped member 100, the upper leg of which fits snugly between lower clamping jaws 36 and approximately even with the bottom of depressions 82 therein. U-shaped member 100 opens toward the front of the machine so that when lower jaws 36 are pivoted up at their front ends to their loading position, a length of tube can be inserted into the open end of member 100 under the working portion of anvil 40. The lower leg of member 100 is supported, as mentioned hereinbefore, on a cylinder 52 (FIG. 1) having a piston rod 102 connected to the underside of member 100. Guide rods 104 are mounted on either side of piston rod 102 in order to support anvil 40 against tilting forward or back. Rods 104 extend downwardly through guide bearings 106 in the frame member 62 of base 10 (FIG. 2).

During periods between splicing operations, the elements of the machine are positioned in readiness to receive a length of inner tube to be spliced. Carriages 16 are spread apart as shown in FIG. 1 with the upper clamping jaws 26, cutter 38 and anvil 40 at their elevated positions. Lower clamping jaws 36, however, are tilted up in their loading positions as shown in the broken-line position of FIG. 7. The operator loads the machine by slipping the central portion of a length of unvulcanized rubber tube under jaws 36 into the space 56 under the upper leg of anvil 40. The flange 65 on support pan 60 helps in properly positioning the tube. The operator then throws operating switches 108 (FIG. 9) which actuate the solenoid valve 81 for reversing the flow of air to cylinders 74 in order to lower jaws 36 to their operative positions shown in FIG. 1. For safety purposes it is desirable to provide two switches 108 of the push-button type located about arm's-length apart, both of which must be manually held closed by the operator until the lower jaws are dropped into operative position. This requires the operator to use both hands in lowering the jaws 36 after he has loaded a tube T onto pan 60, thus rendering it impossible for him to lower the jaws until both his hands are free of the working area.

Having lowered jaws 36 into their operative position, the operator next places the ends of the tube T face-to-face on the working surface of anvil 40 with the adjacent portions of the tube nestled in the depressions 82 of jaws 36. He again is required to use both hands to actuate dual starting switches 136 which initiate the trimming and splicing operations. During these operations, the controls for which are automatic and conventional in machines of this kind, the upper clamping jaws 26 are brought into engagement with the flattened ends of tube T on lower jaws 36 in order to clamp the tube ends firmly in place on carriages 16. Cutter 38 is lowered by means of cylinder 42 to trim the ends of the tube as shown in FIG. 5 and immediately returns to its elevated position. Upon completion of the trimming operation anvil 40 is lowered by means of cylinder 52 into the space 56 below jaws 36 to permit carriages 16 to move inwardly uniting the freshly cut ends of tube T in abutting relation with each other while still being held firmly in clamps 18, as shown in FIG. 6. It is conventional in splicing machines of this kind to direct a jet of air across the top of anvil 40 immediately after the ends of the tube have been trimmed in order to remove the trimmings into a suitable receptacle (not shown).

After a brief dwell of the splicing machine, during which the splice is made, upper clamping jaws 26 are raised from the positions shown in FIG. 6 releasing the spliced tube T. Carriages 16 then separate, and lower jaws 36 are pivoted up to complete the cycle of operations. With the lower jaws raised in loading and unloading position, the spliced tube may be removed from the machine, a new length of tube loaded in its place, and the cycle repeated.

FIG. 9 is a wiring and piping diagram of only that part of the control system for the splicing machine which relates directly to the means for pivoting the lower jaws 36 to and from their loading and operative positions. The remainder of the control system for operating the upper clamping jaws 26, cutter 38, carriages 16 and anvil 40 is conventional and is therefore not shown in detail here.

Electrical power is supplied to the mains 109 and 110 of the control circuit from a suitable source. In the present instance, 109 is the "common" or return side of the power circuit, while 110 is the "hot" side. The latter is conected to push-button switches 108, referred to hereinbefore, for moving the lower jaws 36 to their operative positions. Switches 108 are connected in series and are spring loaded in the open position, so that the operator must hold both switches closed momentarily in order to energize the circuit to the solenoid valve 81 which controls jaws 36. A multiple-switch relay 111 is provided with normally closed contacts 112 which are connected by means of leads 113 and 114, respectively, to switches 108 and to a second multiple-switch relay 115, which in turn is connected by means of lead 115' to common 109.

Relay 115 controls three sets of contacts 116, 118 and 120 simultaneously. Contacts 116 are connected by means of leads 122, 124 in a holding circuit for push-button switches 108 so that the latter may be released as soon as relay 115 is energized. Contacts 118 complete a circuit from main 110 to solenoid valve 81 through leads 122 and 126, solenoid valve 81 being connected directly to common 109 by means of lead 128. It will be seen therefore that upon pressing both switches 108 simultaneously relay 115 is energized closing the circuit to solenoid valve 81. Upon release of switches 108, relay 115 will remain energized by the holding circuit through contacts 116. At the same time, contacts 120 of relay 115 set up a circuit from power main 110 through leads 130 and 132 to the control system for the splicing cycle of the machine. It will be apparent therefore that before the splicing cycle can be initiated, it is necessary first to lower jaws 36 by actuating switches 108.

When not energized solenoid valve 81 is biased to the position in which compressed air from a suitable source of supply (not shown) is directed through hose connections 80 to the outer ends of cylinders 74 so that lower jaws 36 on the machine are held up in their loading positions as previously described. When solenoid valve 81 is energized, the flow of air to cylinder 74 is reversed, the air lines 80 being exhausted while pressure is exerted through lines 78 to the opposite ends of cylinders 74 in order to lower jaws 36 to their operative positions.

It is necessary of course for jaws 36 to be in their operative positions at all times during the splicing cycle especially during the iniital part thereof as the upper jaws 26 are brought into clamping relation with the lower jaws in order to grip the ends of the inner tube. Accordingly, safety means are provided for preventing initiation of the splicing cycle in the event of a malfunction in the mechanism for lowering either jaw 36. To this end, a pair of mechanically operated switches 134 are mounted on the carriages 16 (FIG. 7) for actuation by jaws 36 when in their operative positions. Switches 134 are connected in series between main 110 and contacts 120 of relay 115 and are normally open, thus requiring mechanical actuation directly by both jaws 36 in their operative positions in order to close the power circuit to the controls for the splicing operations. From the foregoing it will be apparent that if either jaw 36 is not in proper operative position, the splicing cycle can not be started, thereby precluding possible damage to the machine or to the inner tubes being spliced due to either or both of the lower jaws 36 being raised above their carriages 16 when the upper clamping jaws 26 are lowered.

Once safety switches 134 are closed, the circuit 130, 132 is completed to a second pair of push-button switches 136, which start the splicing cycle. Both starting switches 136 must be closed simultaneously in order to energize a motor 138 in a timer 139, which may desirably be the timer used for sequencing the splicing operations of the machine. Motor 138 is connected to starting switches 136 by means of a lead 140 and to common 109 by means of a lead 141. As shown purely diagrammatically in FIG. 9, timer 139 includes a series of cams 142, which mechanically actuate a timing switch 144 in addition to a series of air valves (not shown) for the upper jaws 26, carriages 16, cutter 38, and anvil 40. Timing switch 144 is provided in order to automatically raise the lower jaws 36 to their loading position at the end of each splicing cycle. At the start of the splicing cycle starting switches 136 must be held closed by the operator for a period of about ten seconds during which the upper jaws 26 of the inner tube clamps 18 on the machine are lowered into clamping engagement with the ends of the tube on lower jaws 36. This time delay effectively prevents injury to the operator as the clamps grip the ends of the tube.

At the end of this delay period, one of the cams 142 of the timer 139 closes timing switch 144 which completes a circuit to relay 111. Power is supplied relay 111 by means of a lead 146 from the "hot" side of starting switches 136 and a lead 148 to timer switch 144, as well as by leads 149 and 150 connecting relay 111 to switch 144 and to common 109, respectively. Energization of relay 111 closes a pair of contacts 152 completing a holding circuit around starting switches 136 so that these may be released by the operator without interrupting the splicing cycle. This holding circuit consists of a lead 154 from the "hot" side of starting switches 136 to relay contacts 152 and back to lead 140 by means of lead 156.

In addition to starting timer 139, actuation of starting switches 136 also immediately energizes a third multiple-switch relay 160 through a lead 162 from lead 140. Relay 160 is connected to common 109 by a lead 164. Energization of relay 160 closes contacts 166 and 168 providing an alternate circuit by which solenoid valve 81 is kept energized when normally closed contacts 112 open due to energization of relay 111. Thus, contacts 166 of relay 160 are connected by means of a lead 170 to main 110 through safety switches 134, and to timing switch 144 by means of lead 148. At the same time, closing of contacts 168 completes a circuit from main 110 via lead 172 to solenoid valve 81 through a lead 174 to lead 126. Thus, upon closing of timing switch 144 and consequent energization of relay 111 contacts 112 are opened de-energizing the primary control circuit by which solenoid valve 81 was initially actuated. However, before this occurs, an alternate circuit for valve 81 is provided when relay 160 is energized immediately upon actuation of starting switches 136. Consequently, there is no interruption of power to solenoid valve 81.

Upon completion of the splicing cycle when clamps 18 have released the spliced tube and after carriages 16 separate, timing motor 138 opens switch 144 de-energizing relay 111, which in turn opens contacts 152 in the holding circuit around starting switches 136. Since starting switches 136 are spring loaded in the open position and are only held closed by the operator during the initial part of the splicing cycle, opening of contacts 152 breaks the circuit to relay 160, thus opening contacts 168 and de-energizing solenoid valve 81, which automatically reverses the air to lower jaw operating cylinders 74 and pivots jaws 36 upward to their loading positions so that the tube can be removed. De-energization of relay 111 also stops timer motor 138 and closes contacts 112 in order to set up the primary control circuit for again activating solenoid valve 81 when another inner tube is loaded in the machine.

From the foregoing description of one embodiment of the invention, it will be seen that the present invention makes it possible for splicing machines of this general type to accommodate tube stock of much shorter length than the machines were designed to handle. Furthermore, existing machines can be modified in this manner for only a small fraction of the cost of a new machine capable of doing the same job.

While certain embodiments and details of construction have been shown for the purpose of illustrating the invention, it will be apparent to those skilled in the art that various changes and modifications may be made therein without departing from the spirit and scope of the invention.

What is claimed is:

1. In a machine for splicing the ends of a length of rubber-like stock to form an annular band, wherein said machine comprises a pair of spaced movable carriages having broad horizontal upper surfaces, each of said carriages being arranged to receive one end of said stock on its upper surface, an upper clamping jaw operable to hold each end of the stock flat on the upper surface of its respective carriage, and means operable after the ends of the stock are thus clamped for moving said carriages toward each other in order to bring said stock ends into intimate abutting engagement with each other, the improvement comprising in combination a lower clamping jaw mounted on each of said carriages and positioned to receive one of said clamping jaws for gripping one end of said stock, each set of said upper and lower clamping jaws providing a clamp with both said clamps being carried by said carriages into and out of abutting engagement with each other, each lower clamping jaw being pivotally mounted at one end on its respective carriage for pivotal movement from a generally horizontal, operative position in engagement at its free end with said carriage to a loading position in which said free end is raised above the upper surface of said carriage in order to permit the mid-section of said stock to be inserted between said lower clamping jaw and carriage, said upper surfaces of said carriages being provided with aligned recesses on their adjacent sides beneath said lower clamping jaws in order to provide room to receive the mid-section of the stock between said lower clamping jaws and carriages when said lower clamping jaws are in operative position, said lower clamping jaws being disposed on said carriages so that they span said recesses and are supported at both ends by said carriage when said lower jaws are in the operative position, each of said recesses extending in the direction of movement of said carriages beyond the respective lower jaw mounted thereon such that an opening is provided in the upper surface of each carriage on the opposite side of said lower jaw from the corresponding opening in the other carriage, said openings providing space for the mid-section of said stock to extend below said lower jaws when the latter are in their operative position, and means for raising said lower clamping jaws to their loading position so that the mid-section of said stock can be placed below said jaws.

2. The combination defined in claim 1, which further includes means interconnecting each of said lower clamping jaws at its free end with said carriage when said lower clamping jaw is in its operative position for accurately positioning said lower clamping jaw on said carriage.

3. The combination defined in claim 2, wherein said interconnecting means comprises a pin fixed on said carriage and a socket in said lower clamping jaw in alignment with said pin for receiving the same when said jaw is in its operative position.

4. The combination defined in claim 1, wherein said means for pivoting said lower clamping jaws comprises fluid powered means for remotely actuating the pivotal movement of said lower clamping jaws.

5. The combination defined in claim 1, which further includes a trimming anvil mounted below said carriages for vertical movement into position between said clamps, said trimming anvil comprising a horizontally positioned U-shaped member disposed parallel to said clamping jaws, the upper leg of said U-shaped member comprising the working portion of said anvil and the open end of said member facing in the same direction as the free ends of said lower clamping jaws so as to receive the mid-section of said stock below the working portion of said anvil.

6. The combination defined in claim 1, which further includes a stock-supporting pan fixed on said machine within said recesses in said movable carriages, said supporting pan having its central portion disposed below said lower clamping jaws and having upwardly sloping end portions which extend through said openings in said carriages on opposite sides of said lower jaws and into overlapping relation with the upper surfaces of said carriages such that the major portion of the mid-section of said stock is supported in said fixed pan out of engagement with the movable parts of said splicing machine.

7. The combination defined in claim 1, wherein said machine is further provided with control means for actuating said machine through a sequence of operations required in splicing said stock, said means for pivoting said lower clamping jaws comprising fluid powered means, and a control device for actuating said fluid powered means in order to pivot said lower clamping jaws into operative position prior to initiation of the splicing operations and into loading position automatically upon completion of said splicing operations, said control device including a solenoid operated fluid valve and having a primary electrical circuit for energizing said solenoid valve; said primary circuit including a first relay switch to initially energize said solenoid valve, a second relay switch to supply power to said control means for sequencing the splicing operations and a manually operated switch for actuating said first and second relay switches; a second manually operated switch for energizing said control means, a third relay switch for providing an alternate power circuit to said solenoid valve and to said control means, said third relay switch being energized upon closing said second manually operated switch, a fourth relay switch for breaking said primary circuit upon establishment of said alternate circuit, and a timer energized upon closing said second manually operated switch, said timer having means for energizing said fourth relay switch and upon completion of said splicing operations for breaking said alternate power circuit.

References Cited in the file of this patent

UNITED STATES PATENTS

| | | |
|---|---|---|
| 2,024,577 | Haase | Dec. 17, 1935 |
| 2,024,578 | Haase | Dec. 17, 1935 |
| 2,074,485 | Nichols | Mar. 23, 1937 |
| 2,660,216 | Clayton | Nov. 24, 1953 |
| 2,722,590 | Engler | Nov. 1, 1955 |